United State

[11] 3,592,524

[72] Inventor Roland Schlenger
 Heerbrugg, Switzerland
[21] Appl. No. 7,750
[22] Filed Feb. 2, 1970
[45] Patented July 13, 1971
[73] Assignee Wild Heerbrugg Aktiengesellschaft
 Heerbrugg, Switzerland
[32] Priority Oct. 14, 1969
[33] Switzerland
[31] 15389/69

[54] COLLAPSIBLE REFLECTING STEREOSCOPE
 4 Claims, 6 Drawing Figs.
[52] U.S. Cl. .................................. 350/137,
 350/140, 350/143
[51] Int. Cl. .......................................... G02b 27/24,
 G02b 27/22
[50] Field of Search ............................. 350/137,
 140, 143

[56] References Cited
 UNITED STATES PATENTS
1,743,952  1/1930  Barr et al. ..................... 350/137

Primary Examiner—David Schonberg
Assistant Examiner—Paul A. Sacher
Attorney—Werner W. Kleeman ABSTRACT: A collapsible reflecting stereoscope comprising a lens holder and two magnifying lenses carried by said lens holder. The lens holder has two lengthwise surfaces provided with groove means. A pair of outer deflecting mirrors having shaft means are mounted displaceably and pivotally in said groove means, and there are also a pair of inner deflecting mirrors having frame means and equipped with shaft means for pivoting said two inner deflecting mirrors transverse to said lengthwise surfaces of said lens holder. The lens holder has a recess with two inclined surfaces for receiving the upper ends of the frames of the pivoted-out inner deflecting mirrors.

INVENTOR
ROLAND SCHLIENGER

BY
ATTORNEY

COLLAPSIBLE REFLECTING STEREOSCOPE

BACKGROUND OF THE INVENTION

The present invention relates to an improved collapsible reflecting stereoscope having a lens holder and reflecting or surface mirror.

For stereoscopic, magnified viewing of photographs there is used the known photogrammetrical reflecting stereoscopes or the small pocket stereoscopes. The reflecting stereoscopes have an observation base which is between 21 and 26 cm. The rather large reflecting stereoscopes were, above all, designed for the stereoscopic, magnified observation of photogrammetrical aerial photographs with longitudinal overlap of 50 percent to 90 percent and with a maximum picture size of 23 by 23 centimeters.

The maximum magnification of such reflecting stereoscopes is approximately eightfold. Since the reflecting stereoscopes are already rather heavy because of their large spatial dimensions and are difficult to handle when in collapsed or folded condition for so-called field use, as is known so-called pocket stereoscopes were developed. During construction of the pocket stereoscope, attention was only paid to achieving the smallest optimum possible outer dimensions. Thus, there was dispensed with the different advantages of the substantially larger reflecting stereoscopes. The observation base in the pocket stereoscopes is only as large as the insight (eyepiece) basis, i.e. interocular distance, in other words a distance of about 6 cm. Since the pocket stereoscopes do not possess deflecting mirrors, their manufacture is also inexpensive. Optical magnification is at a maximum threefold. These stereoscopes are lightweight and small and can, therefore, easily be carried around in the pocket of the clothing of a person who has to view photogrammetrical pictures in the countryside. However, the pocket stereoscopes have the disadvantage that for generating a stereoscopical effect in the case of aerial photographs having a format of 23 cm. by 23 cm. with longitudinal overlap of 60 percent which are usually used in photogrammetry, the areas of mutuality cannot be viewed without forcing the viewer to roll or bend the photograph on the inner side because of the small observation base.

SUMMARY OF THE INVENTION

It is a primary object of the present invention to avoid the disadvantages of known reflecting and pocket stereoscopes and to combine the advantages of a large observation basis, a large longitudinal overlap and small spatial dimensions.

The invention is generally characterized by the features that the lens holder containing two magnifying lenses possess grooves at their two longitudinal surfaces, in which grooves two outer deflecting mirrors are arranged such that their axes are displaceable and pivotal, and other shafts for swiveling the two inner deflecting mirrors are secured transverse relative to the longitudinal surfaces of the lens holder. Furthermore, a recess with two inclined lateral surfaces is provided in the lens holder for receiving the upper ends of the frames of the inner mirror which is pivoted out.

BRIEF DESCRIPTION OF THE DRAWINGS

The invention will be better understood, and objects other than those set forth above, will become apparent, when consideration is given to the following detailed description thereof. Such description makes reference to the annexed drawings wherein.

DESCRIPTION OF THE PREFERRED EMBODIMENTS

Figure 1:
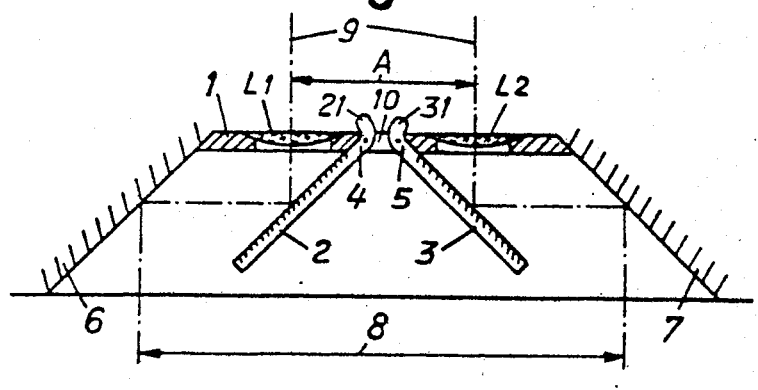
FIG. 1 depicts a schematic sectional view of a pocket size reflecting stereoscope.

Describing now the drawings, it will be seen that the two lenses L1, L2 are arranged in lens holder 1. The insight or eyepiece basis equals distance A of these two lenses and is 65 mm. according to FIG. 1. The magnification is about 2.3 fold. The lenses or magnifiers L1, L2 have such a large diameter that an undisturbed stereoscopical viewer, or observation is ensured even in the case of varying individual ocular distances of 55 mm. to 75 mm. without changing the distance of the lenses. According to FIG. 1, the two inner mirrors 2, 3 are arranged with their shafts or axes 4, 5 in lens holder 1 in such manner that the deflecting mirrors 2, 3 can be folded into the lens holder, and in their operational position they assume an angle of 45° relative to the lens holder 1. The frames of the two inner deflecting mirrors 2 and 3 possess at their upper end nose members 21, 31, respectively, which engage with recess 10 of lens holder 1. Thereby, the operational position of the two inner deflecting mirrors is fixed. This is more closely described in connection with FIGS. 2 and 4.

The two outer surface or deflecting mirrors 6 and 7 are schematically depicted in operational position according to FIG. 1. As will be more fully described later, the two outer deflecting mirrors 6 and 7 which are arranged by shafts or axes in guide grooves of the lens holder 1 so as to be displaceable and pivotable, can be slipped over lens holder 1 and lenses L1, L2. The advantage resulting from folding of the individual deflecting mirror lies in the fact that the pocket reflecting stereoscope exhibits outer dimensions of only 19 cm. by 6.5 cm. by 2 cm. when in collapsed or folded condition. Furthermore, the deflecting or surface mirrors with their mirror surfaces are arranged relative to lens holder 1 in such fashion that the lenses or magnifiers as well as the surface mirrors are largely protected. This is especially important during transportation of the reflecting stereoscope.

FIG. 1 illustrates the reflecting stereoscope possessing an observation basis of 170 mm. when in operational position. The field of view corresponds to an equivalent circle of 70 mm. diameter. Lenses L1, L2 cannot be focused. In order to reduce the weight, all parts of the stereoscope with the exception of the optical system are made of plastic. What is essential for the reflecting stereoscope is that it allows the stereoscopical, magnified observation of aerial photographs of the maximum size of 23 cm.×23 cm. with longitudinal overlap of 70 percent maximum, without necessitating rolling or bending of these pictures, as is the case in known stereoscopes. As a result of the observation basis 8 of 170 mm., successive aerial photographs in the format of 23 cm. by 23 cm. of an uncut roll of film with a standard overlap of 60 percent can be viewed stereoscopically magnified. However, this is only true under the provision that the area of mutuality lies "inside" and that the direction of flight corresponds to the direction of the film feed of the surveying-camera unit.

According to FIG. 1, the path of rays was deflected upon the large observation basis 8 via the deflecting mirrors. Deflecting mirrors 2, 3, 6, 7 are fixedly arranged in their operational position at lens holder 1.

Figure 2:
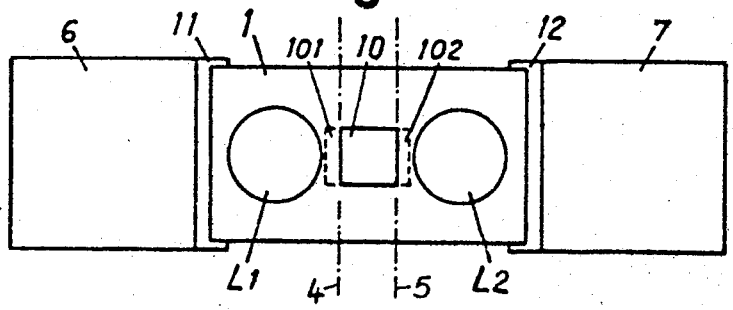
FIG. 2 depicts a top view of the stereoscope in operational position, in which instance the inner deflecting mirrors are not illustrated.
Figure 3:
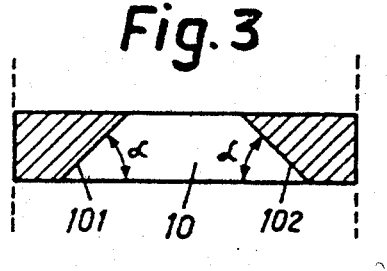
FIG. 3 depicts a sectional view through the recess which is arranged between the two lenses in the lens holder.

According to FIG. 2, a recess 10 is provided between the two lenses L1, L2 in lens holder 1. Recess 10 which in FIG. 3 is depicted in sectional and magnified view, possesses two inclined surfaces 101, 102 which form an angle α of 45° with the base surface of lens holder 1. The side surfaces 101, 102 serve as impact or stop surfaces for the frames of inner deflecting or surface mirrors 2, 3. The shafts or axes 4, 5 of the deflecting mirrors 2 and 3 are fixedly mounted in lens holder 1 so that the inner deflecting mirrors, which are folded out, bear with their upper ends or noses 21, 31 against stop faces 101, 102, respectively. The upper ends or noses 21 and 31 together have the same length as recess 10 in lens holder 1. According to FIG. 2, frames 11 and 12 of the outer surface mirrors 6 and 7 engage in grooves which are arranged at the side surfaces of the lens holder. This will be more fully described later on. The top-view of FIG. 2 shows the pocket size reflecting stereoscope in a position of operation, in other words, its position of use.

Figure 4:
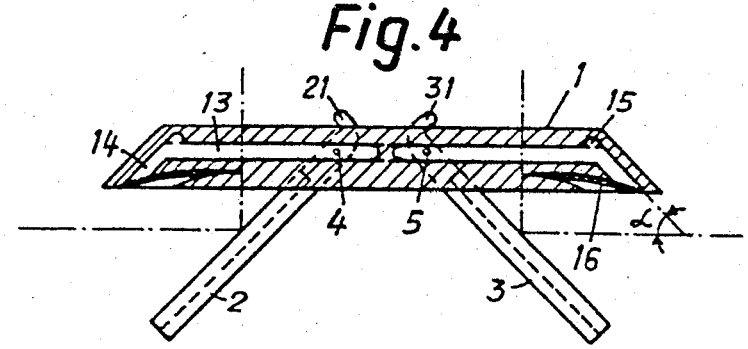
FIG. 4 depicts a side view of the lens holder with the grooves for the shafts or axes of the two outer, not illustrated deflecting mirrors as well as the two inner deflecting mirrors in pivoted-out position.
Figure 5:
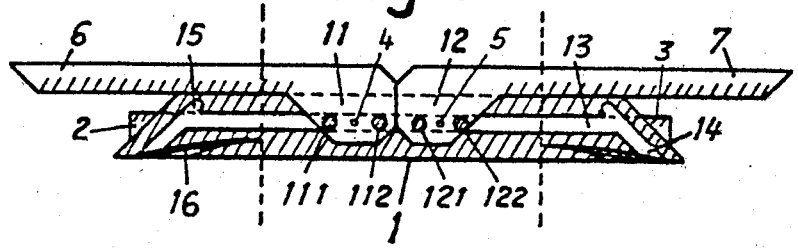
FIG. 5 depicts the folded or collapsed pocket stereoscope.

Grooves 13, according to FIGS. 4 and 5, are arranged in the longitudinal surfaces of lens holder 1. Shafts or axes 111, 112, 121, 122 of frames 11 and 12 of the two outer surface mirrors 6 and 7 travel in these grooves. Grooves 13 are horizontally arranged in the longitudinal or lateral surfaces of lens holder 1 and terminate at one side into another respective groove 14 which is displaced by 45°. Groove 14 is formed at one side as a notch 15 and possesses at the other side a retaining spring 16. When the two outer mirrors 6 and 7 bear upon lens body 1 with their reflecting surface, the shafts or axes 111, 112, 121, 122 are arranged in guide grooves 13 until they contact one another. This condition is, for example, shown in FIG. 5. When, now, the outer deflecting mirrors 6 and 7 are to be displaced into a position of operation or use and are to be swiveled, then the shafts 111, 112, 121, 122 in the two guide grooves 13 are displaced into grooves 14. Shafts 112, 121 are subsequently displaced into the notches 15 of grooves 14. Retaining springs 16 at the open ends of grooves 14 press against shafts 111, 122 so that a fixed operative position of the two outer deflecting mirrors 6 and 7 is brought about. The angle α of the two outer surface or deflecting mirrors 6 and 7 relative to lens holder 1 amounts to 45°. As soon as the two outer reflecting or surface mirrors 6, 7 have been folded out of the position of rest, as shown in FIG. 5, into the operative positions depicted in FIGS. 1 and 2, the two inner mirrors 2 and 3 are automatically also pivoted into the operative positions according to FIGS. 1, 2, 4, since the outer mirrors 6 and 7 no longer press against noses 21, 31 of deflecting mirrors 2 and 3. Solely by virtue of the force of gravity, the inner reflecting or surface mirrors 2, 3 tilt into an operative position which forms an angle α of 45° relative to lens holder 1. The latter is ensured by stop faces 101, 102.

Figure 6:
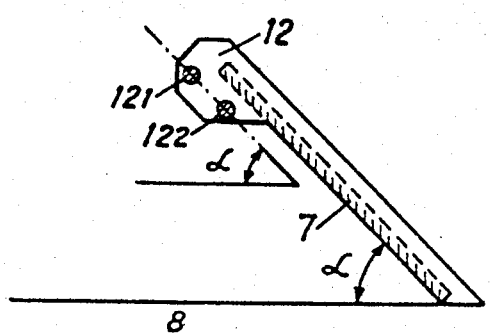
FIG. 6 depicts a side view of the mounting or enclosure of one of the outer mirrors in operational position.

FIG. 6 depicts frame 12 of the one outer deflecting mirror 7 with shafts or axes 121 and 122. Due to the particular arrangement of shafts 121 and 122 relative to mirror 7 it is guaranteed that in any event there is formed an angle α of 45° relative to observation basis 8.

The swiveling and displacement of the outer deflecting mirrors 6, 7 into the position of rest is carried out in two movements for each mirror. After overcoming the force of retaining spring 16 by means of shaft 111 or 122, shaft 112 or 121 is removed from notch 15 and is slipped into its associated guide groove 13. Simultaneously with the rotation of mirrors 6 and 7, there occurs also a displacement of said mirrors since shafts 111, 112, 121, 122 are slipped into guide grooves 13. This slipping-in movement occurs for such length of time until shafts 112 and 121 meet upon the end of guide grooves 13 in the middle of the longitudinal surface of lens holder 1. Reflecting mirrors 6 and 7 then assume the position of rest as shown in FIG. 5. By virtue of displacing the outer deflecting mirrors 6 and 7 into this position of rest, noses 21 and 31 of the inner deflecting or surface mirrors 2 and 3 are also pressed into opening 10 of lens holder 1, so that deflecting mirrors 2 and 3 reach the position of rest at the same time as the outer deflecting mirrors 6 and 7 are displaced. Thus, when the stereoscope is in folded condition, the reflector surfaces of the four surface mirrors 2, 3, 6, 7 are protected to a large extent. Lens holder 1 is situated between these mirrors so that the lenses or magnifiers L1, L2 are also protected from outside influences.

It should be apparent from the foregoing detailed description that the objects set forth at the outset to the specification have been successfully achieved.

What I claim is:

1. A collapsible reflecting stereoscope comprising a lens holder, two magnifying lenses carried by said lens holder, said lens holder having two lengthwise surfaces provided with groove means, a pair of outer deflecting mirrors having shaft means mounted displaceably and pivotally in said groove means, a pair of inner deflecting mirrors having frame means and equipped with shaft means for pivoting said two inner deflecting mirrors transverse to said lengthwise surfaces of said lens holder, said lens holder having a recess with two inclined surfaces for receiving the upper ends of the frames of the pivoted-out inner deflecting mirrors.

2. A reflecting stereoscope as defined in claim 1, wherein said groove means comprises two respective grooves which enclose a predetermined angle, and wherein each pair of shaft means associated with an outer deflecting mirror is displaceably and pivotally arranged in said associated respective two grooves of said groove means.

3. A reflecting stereoscope as defined in claim 2, wherein said two respective grooves incorporate an outer groove which is formed at its one end to provide a notch and at its other open end is closed by detaining spring means.

4. A reflecting stereoscope as defined in claim 1, wherein said groove means comprises a respective pair of grooves arranged at a predetermined angle with respect to one another, and wherein said recess is arranged between both of said magnifying lenses at said lens holder, the angle of both side surfaces of said recess with respect to a base surface of said lens holder being equal to the angle of each respective pair of grooves of said groove means.